US008880258B2

(12) United States Patent
Breton et al.

(10) Patent No.: US 8,880,258 B2
(45) Date of Patent: Nov. 4, 2014

(54) HYBRID POWERTRAIN CONTROL
(71) Applicant: Tula Technology, Inc., San Jose, CA (US)
(72) Inventors: Leo G. Breton, Washington, DC (US); Ronald D. Yuille, Sarasota, FL (US); Mark A. Shost, Northville, MI (US); Louis J. Serrano, Los Gatos, CA (US); John W. Parsels, San Jose, CA (US); Matthew A. Younkins, San Jose, CA (US)
(73) Assignee: Tula Technology, Inc., San Jose, CA (US)
( * ) Notice: Subject to any disclaimer, the term of this patent is extended or adjusted under 35 U.S.C. 154(b) by 223 days.
(21) Appl. No.: 13/681,378
(22) Filed: Nov. 19, 2012
(65) Prior Publication Data
US 2013/0096759 A1    Apr. 18, 2013
Related U.S. Application Data
(63) Continuation-in-part of application No. 13/654,217, filed on Oct. 17, 2012.
(60) Provisional application No. 61/548,188, filed on Oct. 17, 2011, provisional application No. 61/560,803, filed on Nov. 17, 2011, provisional application No. 61/570,277, filed on Dec. 13, 2011.
(51) Int. Cl.
B60L 11/00    (2006.01)
B60W 20/00    (2006.01)
B60W 10/06    (2006.01)
B60W 10/08    (2006.01)
B60K 6/485    (2007.10)
B60K 6/28    (2007.10)
(52) U.S. Cl.
CPC .............. *B60W 20/10* (2013.01); *Y10S 903/93* (2013.01); *B60W 10/06* (2013.01); *B60W 10/08* (2013.01); *B60K 6/485* (2013.01); *B60K 6/28* (2013.01); *Y02T 10/6286* (2013.01); *B60Y 2300/435* (2013.01); *B60Y 2400/114* (2013.01); *Y02T 10/6226* (2013.01)
USPC ............ 701/22; 701/84; 701/101; 73/114.02; 903/930

(58) Field of Classification Search
CPC ........... G01M 15/11; F02D 2200/1015; F02D 2250/18; B60W 2710/0666; B60W 10/06
USPC ............. 701/22, 84–87, 101, 102; 73/114.02; 123/350, 98 F; 180/65.1, 65.21, 65.285; 477/7
See application file for complete search history.

(56) References Cited
U.S. PATENT DOCUMENTS 4,434,767 A    3/1984    Kohama et al.
4,489,695 A    12/1984    Kohama et al.
(Continued)

FOREIGN PATENT DOCUMENTS

JP    2004-068759    3/2004
WO    WO2005/073004    8/2005
WO    WO 2005/073004    8/2005

OTHER PUBLICATIONS

International Preliminary Report on Patentability dated Jan. 3, 2014 from International Application No. PCT/US2012/060674.
(Continued)

*Primary Examiner* — Mary Cheung
(74) *Attorney, Agent, or Firm* — Beyer Law Group LLP

(57) ABSTRACT

Methods and arrangements for controlling hybrid powertrains are described. In one aspect, an engine is alternatingly operated at different effective displacements. One displacement delivers less than a requested powertrain output and the other delivers more. A motor/generator system is used to add and subtract torque to/from the powertrain to cause the net delivery of the requested powertrain output. In some embodiments, energy added and subtracted from the powertrain is primarily drawn from and stored in a capacitor (e.g., a supercapacitor or an ultracapacitor) when alternating between effective displacements. In another aspect a hybrid powertrain arrangement includes an engine a motor/generator and an energy storage system that includes both a battery and a capacitor. The capacitor stores and delivers electrical energy to the motor/generator unit during operation of the engine in a variable displacement or skip fire mode.

36 Claims, 7 Drawing Sheets

(56) References Cited

U.S. PATENT DOCUMENTS

| | | |
|---|---|---|
| 4,509,488 A | 4/1985 | Forster et al. |
| 5,377,631 A | 1/1995 | Schechter |
| 5,806,617 A | 9/1998 | Yamaguchi |
| 5,975,052 A | 11/1999 | Moyer |
| 6,006,157 A | 12/1999 | Dai et al. |
| 6,158,411 A | 12/2000 | Morikawa |
| 6,364,807 B1 | 4/2002 | Koneda et al. |
| 6,487,998 B1 | 12/2002 | Masberg et al. |
| 6,494,087 B2 | 12/2002 | Daicho et al. |
| 6,619,258 B2 | 9/2003 | McKay et al. |
| 6,691,807 B1 | 2/2004 | Bhavsar et al. |
| 6,692,404 B2 | 2/2004 | Matsubara et al. |
| 6,718,937 B2 | 4/2004 | Kim |
| 6,886,524 B2 | 5/2005 | Hanada et al. |
| 6,943,460 B2 | 9/2005 | Wakashiro et al. |
| 6,986,399 B2 | 1/2006 | Bhavsar et al. |
| 7,021,409 B2 | 4/2006 | Tamor |
| 7,059,997 B2 | 6/2006 | Nishizawa et al. |
| 7,063,062 B2 | 6/2006 | Lewis et al. |
| 7,085,647 B1 | 8/2006 | Prucka et al. |
| 7,086,386 B2 | 8/2006 | Doering |
| 7,104,244 B2 | 9/2006 | Nishi et al. |
| 7,225,782 B2 | 6/2007 | Pallett et al. |
| 7,225,783 B2 | 6/2007 | Hohnstadt et al. |
| 7,232,401 B2 | 6/2007 | Albertson |
| 7,240,749 B2 | 7/2007 | Bhavsar et al. |
| 7,275,518 B1 | 10/2007 | Gartner et al. |
| 7,275,916 B2 | 10/2007 | Smith et al. |
| 7,278,392 B2 | 10/2007 | Zillmer et al. |
| 7,308,886 B2 | 12/2007 | Balles et al. |
| 7,308,959 B2 | 12/2007 | Roberts |
| 7,320,300 B2 | 1/2008 | Lewis et al. |
| 7,350,499 B2 | 4/2008 | Takaoka et al. |
| 7,426,915 B2 | 9/2008 | Gibson et al. |
| 7,456,509 B2 | 11/2008 | Gray, Jr. |
| 7,503,312 B2 | 3/2009 | Surnilla et al. |
| 7,530,413 B2 | 5/2009 | Rayl |
| 7,577,511 B1 | 8/2009 | Tripathi et al. |
| 7,580,779 B2 | 8/2009 | Zillmer et al. |
| 7,751,963 B2 | 7/2010 | Gecim et al. |
| 7,775,310 B2 | 8/2010 | Andri |
| 7,849,835 B2 | 12/2010 | Tripathi et al. |
| 7,867,134 B2 | 1/2011 | Choi |
| 7,886,715 B2 | 2/2011 | Tripathi et al. |
| 7,930,087 B2 | 4/2011 | Gibson et al. |
| 7,946,275 B2 | 5/2011 | McDonald et al. |
| 7,950,359 B2 | 5/2011 | Choi |
| 7,954,474 B2 | 6/2011 | Tripathi et al. |
| 7,972,235 B2 | 7/2011 | Usoro et al. |
| 8,015,960 B2 | 9/2011 | Watanabe |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,135,532 B2 | 3/2012 | Heap et al. |
| 8,145,410 B2 | 3/2012 | Berger et al. |
| 8,251,044 B2 | 8/2012 | Russell et al. |
| 8,336,521 B2 | 12/2012 | Tripathi et al. |
| 8,473,179 B2 | 6/2013 | Whitney et al. |
| 2002/0170527 A1* | 11/2002 | Rayl et al. .................. 123/198 F |
| 2006/0086546 A1 | 4/2006 | Hu et al. |
| 2006/0130814 A1* | 6/2006 | Bolander et al. .............. 123/481 |
| 2008/0135021 A1 | 6/2008 | Michelini et al. |
| 2008/0154468 A1 | 6/2008 | Berger et al. |
| 2008/0185194 A1 | 8/2008 | Leone |
| 2009/0084618 A1 | 4/2009 | Thompson et al. |
| 2009/0105896 A1 | 4/2009 | Tamai et al. |
| 2010/0050993 A1 | 3/2010 | Zhao et al. |
| 2010/0211297 A1* | 8/2010 | Doering et al. ................ 701/112 |
| 2011/0030657 A1 | 2/2011 | Tripathi et al. |
| 2011/0130902 A1 | 6/2011 | Heisel et al. |
| 2011/0144838 A1 | 6/2011 | Matthews et al. |
| 2011/0213540 A1 | 9/2011 | Tripathi et al. |
| 2011/0251773 A1 | 10/2011 | Sahandiesfanjani et al. |
| 2012/0031357 A1 | 2/2012 | Ervin et al. |
| 2012/0109495 A1 | 5/2012 | Tripathi et al. |
| 2012/0143471 A1 | 6/2012 | Tripathi et al. |
| 2013/0066502 A1 | 3/2013 | Tripathi et al. |
| 2013/0092127 A1 | 4/2013 | Pirjaberi et al. |

OTHER PUBLICATIONS

International Preliminary Report on Patentability dated Oct. 4, 2013 from International Application No. PCT/US2012/65944.
Written Opinion dated Mar. 27, 2013 in International Application No. PCT/US2012/060674.
International Search report dated Mar. 27, 2013 in International Application No. PCT/US2012/060674.
International Search Report dated Feb. 7, 2013, from PCT/US2012/065944.
Written Opinion dated Feb. 7, 2013, from PCT/US2012/065944.
U.S. Office Action dated Sep. 5, 2014 from U.S. Appl. No. 13/654,217.

\* cited by examiner

BSFC of 4 cylinder passenger car engine vs. engine speed and torque and approximate cylinder specific torque in parentheses

HYBRID POWERTRAIN CONTROL

CROSS-REFERENCE TO RELATED APPLICATIONS

This application is a continuation-in-part of U.S. application Ser. No. 13/654,217 filed on Oct. 17, 2012, which claims priority of Provisional Application No. 61/548,188 filed on Oct. 17, 2011. This application also claims the priority of Provisional Application Nos. 61/560,803 filed on Nov. 17, 2011, and 61/570,277 filed on Dec. 13, 2011. Each of these prior applications is incorporated herein by reference.

BACKGROUND

The present invention relates to an apparatus for, and a method of improving the fuel economy of internal combustion engines used in hybrid vehicles and used in stationary applications.

When generating power or providing torque with an internal combustion engine for the purpose of propelling a vehicle, or for providing power for stationary applications, it is desirable to maximize energy efficiency and minimize net fuel usage.

It is well-known that the energy efficiency of an internal combustion engine is dependent on matching the engine characteristics to the intended application. Unfortunately, only a limited number of engine sizes are available which makes it difficult to choose an engine with optimal characteristics, even in the case of steady power requirements. Furthermore, many engines are employed in applications with varying loads for which the ideal engine characteristics also vary. Therefore, it is usually the case that no single conventional engine is the best choice for the full set of operating conditions to be encountered.

Known in the art for purposes of improved fuel economies are numerous "variable displacement engine" designs and strategies using "cylinder deactivation," i.e. operating with a reduced number of active cylinders, as conditions allow. Long period, commercially available deactivation strategies in automobiles with only a subset of the cylinders capable of deactivation operate at somewhat improved fuel efficiencies but do not operate at substantially maximum fuel efficiency over most of the operating conditions to be experienced. This is because more than the minimum, fractional number of cylinders necessary to achieve the desired output at peak fuel efficiency are employed most of the time, and therefore, the active cylinders must still be purposefully de-rated or throttled to ensure the desired output.

Another known approach is often referred to as "skip fire" engine control. Skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions. In general, skip fire engine control is understood to offer a number of potential advantages, including the potential of significantly improved fuel economy in many applications. Such skip fire control was described, for example by Förster (U.S. Pat. No. 4,509,488) and in a number of co-assigned patents such as Tripathi (U.S. Pat. No. 7,954,474). During skip fire operation, a cylinder may be deactivated during skipped cycles so that air is not pumped through the cylinder, which helps reduce pumping losses.

Another way to improve fuel economy in a vehicle is to employ an engine as part of a hybrid electric or hybrid hydraulic propulsion system whereby an otherwise smaller displacement engine with improved fuel economy can be used and which allows the engine to be operated by automated control systems at a narrower range of engine speeds and outputs. Hanada (U.S. Pat. No. 6,886,524) discloses a variable displacement engine combined with a hybrid powertrain configuration. Although Hanada's system can offer improve fuel efficiencies, there are continuing efforts to further improve the efficiency of hybrid powertrains.

SUMMARY

Various methods and arrangements for controlling hybrid powertrains are described. In one aspect, an engine in a hybrid powertrain is alternatingly operated at different effective displacements. One of the displacements delivers less than a requested powertrain output and energy drawn from an energy storage device is used to add torque to the powertrain to cause the net delivery of the requested powertrain output. A second displacement delivers more than the requested powertrain output and torque is subtracted from the powertrain to cause the delivery of the desired output, with the excess energy subtracted from the powertrain being stored in the energy storage device. A motor/generator unit or other suitable device may be used to add and subtract torque from the powertrain. The motor/generator unit may take the form of one or more integrated motor/generator(s) or separate motor and generator units or combinations thereof.

The engine working chambers are preferably operated in a manner that provides substantially the maximum available energy efficiency when alternating between the first and second displacements and unfired working chambers are preferably deactivated to reduce pumping losses.

In some embodiments, the energy added and subtracted from the powertrain is primarily drawn from and stored in a capacitor (e.g., a supercapacitor or an ultracapacitor) when alternating between the first and second effective displacements. In other embodiments, batteries or other suitable energy storage devices may be used for this purpose. The different effective displacements may be provided through the use of traditional variable displacement strategies (e.g., different displacements in a variable displacement engine), through the use of different firing fractions in a skip fire control strategy, or in any other suitable manner.

In some embodiments, the motor/generator unit may being arranged to facilitate regenerative braking and configured such that during regenerative braking electricity generated by the motor/generator unit is stored in at least in part in both the capacitor and a battery.

In another aspect a hybrid powertrain arrangement includes an engine and a motor/generator unit. The engine is capable of operating in a variable displacement mode or it is capable of operating in a skip fire mode. A battery and a capacitor (e.g., a supercapacitor or an ultracapacitor) are arranged such that they may be charged and discharged by the motor/generator unit, with at least the capacitor being arranged to store and deliver electrical energy to the motor/generator unit during operation of the engine in the variable displacement or skip fire mode. A controller is arranged to direct the engine and motor/generator unit to cooperatively deliver a requested output.

In various embodiments, the controller is further arranged to operate the engine in a manner that provides substantially the maximum available energy efficiency during operation in the variable displacement mode or the skip fire mode and preferably the controller is further arranged to deactivate unfired working chambers in the variable displacement mode or the skip fire mode to thereby reduce pumping losses.

In some embodiments, the controller may be arranged to alternatingly operate the engine at different effective displacements and cooperatively control the motor/generator to deliver a desired powertrain output as described above.

In still another aspect, a hybrid powertrain controller is described. The hybrid powertrain controller includes an engine controller arranged to operate an engine in a manner that delivers a plurality of different effective displacements and a motor controller that directs the operation of a motor/generator unit. The control system is arranged to direct the motor/generator to charge and discharge a capacitor in a manner that accounts for transitory variations in the torque delivered by the engine.

DETAILED DESCRIPTION OF THE DRAWINGS

Figure 1:
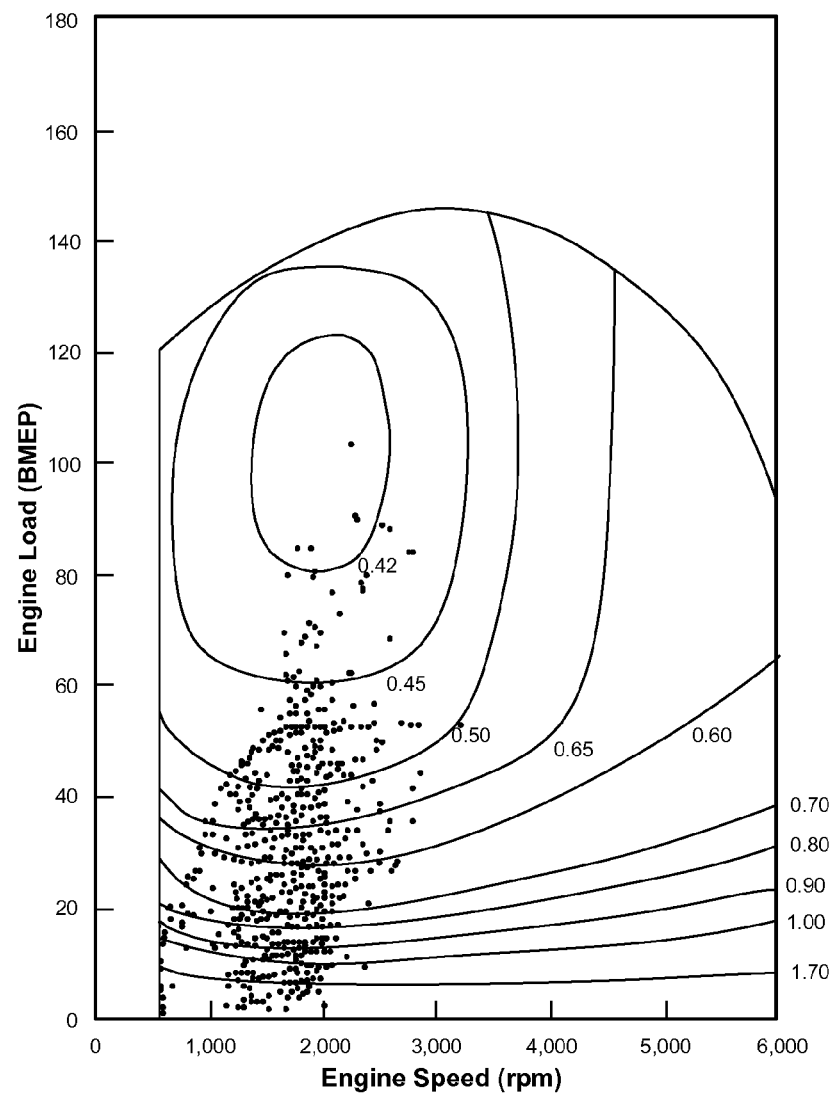
FIG. 1 is a graph illustrating brake specific fuel consumption of a representative internal combustion engine.

The present invention relates to systems and methods for improving the overall energy efficiency of a stationary or mobile power delivery system employing an internal combustion engine possessing one or more working chambers (e.g., cylinders) as part of a hybrid powertrain.

In some preferred embodiments, a single or multiple cylinder variable displacement engine is operated in conjunction with, or assisted by, another power source and sink such as an electric motor/generator and corresponding electrical storage to deliver the desired powertrain output. In this arrangement, each activated cylinder is operated under conditions that tend to facilitate substantially the best fuel economy or minimum brake specific fuel consumption for that cylinder at a given engine speed and required total combined powertrain output. In other embodiments, the cylinders may be operated under conditions that are optimized taking factors in addition to brake specific fuel consumption into account, including, for example, emission characteristics, noise vibration and harshness (NVH) concerns, etc. By employing energy storage systems and improved control methodologies, the overall efficiency of delivering power is increased compared with conventional variable displacement internal combustion engines, conventional hybrid power delivery systems, and conventional hybrid power delivery systems employing variable displacement internal combustion engines.

In some embodiments, skip fire control approaches are used to allow the engine to effectively operate at displacements that correspond to the use of a non-integer number of cylinders. By way of example, in a conventional six cylinder variable displacement engine, the engine may be able to operate using 3, 4 or 6 cylinder (corresponding to ½, ⅔ or 100% of the engine's full displacement). When skip fire control is used, a wider range of fractional displacements may effectively be obtained by simply varying the fraction of the cylinders that are fired. This allows the engine output to more closely match the desired powertrain output. In such embodiments, the sets of available firing fractions may be dictated by a wide range of different factors including NVH concerns, control strategies, etc.

Energy storage systems may utilize batteries, ultracapacitors or other storage techniques. When batteries are used, batteries having lower charging and discharging energy losses and faster charging capabilities are generally preferred. At the present time, ultracapacitors (aka supercapacitors) or hydraulic pressure storage are particularly well-suited because of their relatively small energy losses while "charging", their fast "charging" capabilities, and long lifetimes under conditions of repetitive and numerous charge and discharge cycling.

The integration of ultracapacitors with a conventional hybrid electric power delivery system allows maximum improvement of the efficiency of a conventional hybrid electric power delivery system, the ultracapacitors being employed to alternately absorb surplus engine torque and compensate for deficit torque. Additionally, the ultracapacitors may absorb some or all regenerative braking energy.

In one described operational approach, the effective displacement of an engine may be alternatingly varied between a first displacement that provides more than the requested powertrain output and a second displacement that provides less than the requested powertrain output. In such a system, the minimum energy storage capacity that is needed to operate the system can be determined based in significant part on how frequently the effective displacement (e.g., the number of deactivated cylinders in a variable displacement engine) can be changed without overly compromising other design goals. Relatively small energy storage capacities (e.g. small ultracapacitors) can be advantageous and inexpensive when used with variable displacement engine technologies that allow frequent changes to the number of deactivated working chambers. Larger energy storage capacities are necessary for use with variable displacement engine technologies in which less frequent changes to the number of deactivated cylinders is preferable.

To better understand some of the benefits provided by the described approach reference is made to FIG. 1. The figure is a graph showing an exemplary brake specific fuel consumption (BSFC) map of a conventional passenger car internal combustion engine vs. engine load and engine speed. In this view, the engine load is in terms of brake mean effective pressure (BMEP) but could also be shown in terms of brake horsepower hour or kilowatt-hrs. The lower the BSFC value, the more efficiently the engine coverts the chemical energy of the fuel into mechanical work. The figure shows the most efficient engine operation for this particular engine is centered around 2,000 rpm and approximately 100 BMEP. The plotted points in the figure also illustrate that during normal driving, the majority of engine speeds and loads experienced are at engine loads that are associated with significantly higher BSFC values and reduced engine energy efficiency, compared with the minimum BSFC region. It should be apparent that an engine will at least theoretically have better fuel efficiency if it operates under conditions generally closer to the sweet spot where BSFC is the lowest and the engine is therefore most efficient. Hybrid drivetrain vehicles, variable displacement internal combustion engines, and the combination of hybrid drivetrain vehicles employing variable displacement internal combustion engines have all been described as having the potential for causing a greater fraction of real-world, in-use engine operation to occur closer to the region of minimum BSFC and higher energy efficiency, among other energy efficiency improvements of the overall vehicle.

Figure 2A:
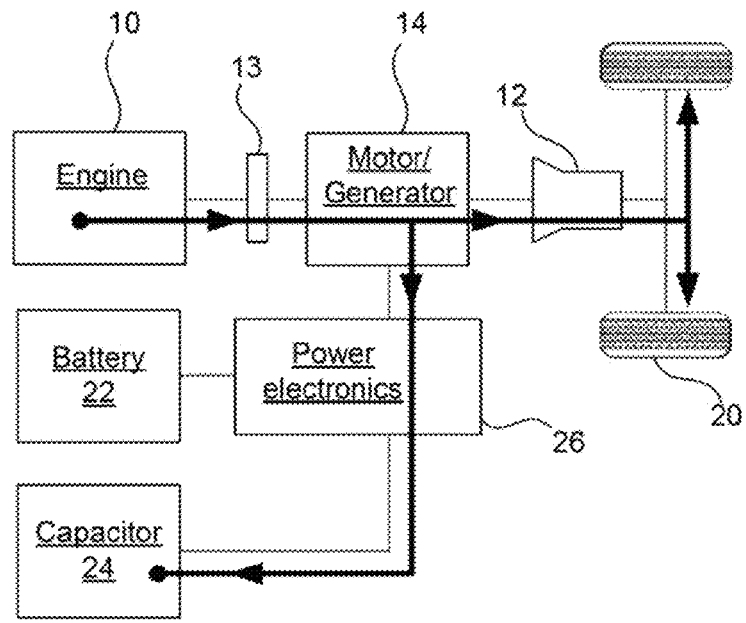
FIG. 2A is a diagrammatic illustration of a representative hybrid powertrain operating in a manner in which a generator subtract torque from a powertrain and generates electrical energy which is stored in an energy storage system that includes a capacitor.
Figure 2B:
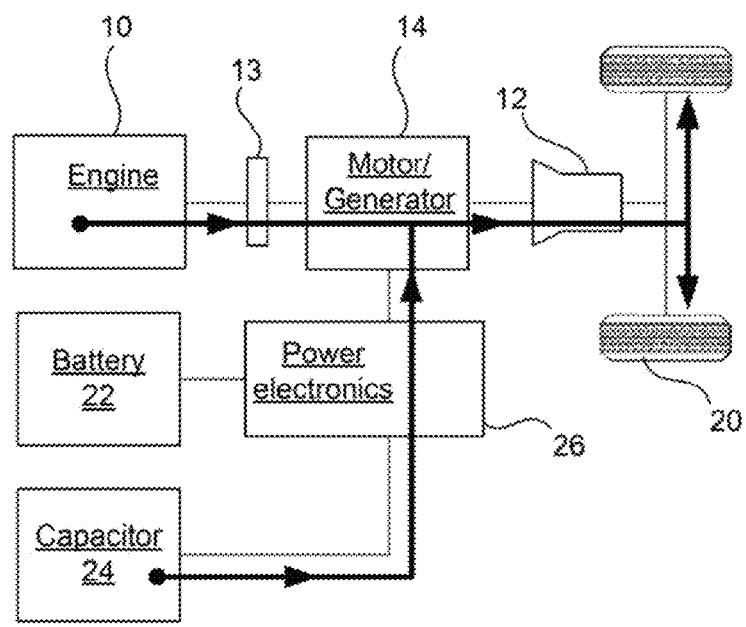
FIG. 2B is a diagrammatic illustration of the hybrid powertrain of FIG. 2A operating in a manner in which a motor adds torque to the powertrain and is powered by electricity drawn from the capacitor.

FIGS. 2(a) and 2(b) schematically illustrates an exemplary hybrid electric vehicle powertrain and associated components that can be used to in conjunction with the present invention. These figures shows a parallel hybrid electric powertrain configuration however, it should be appreciated that the same concepts can be applied to other hybrid powertrains including series hybrid electric configurations, powersplit electric configurations and hydraulic hybrid configurations, although the largest improvements in fuel efficiency are expected for the parallel and series electric hybrid configurations.

FIGS. 2(a) and 2(b) show a variable displacement engine 10 applying torque to a drive shaft which is connected to a transmission 12, which in turn drives selected wheels 20 of a vehicle. A Motor/Generator 14 is also coupled to the drive shaft and is capable of either simultaneously generating electrical power (thereby effectively subtracting torque from the drive shaft) or supplementing the engine torque, depending on whether the engine is producing surplus torque or deficit torque relative to a desired powertrain torque output.

When the engine produces surplus torque as represented by FIG. 2(a), the surplus torque causes the Motor/Generator 14 to generate electricity which gets stored in the Battery 22 and/or the Ultracapacitor 24 after conditioning by the Power Electronics 26. The power electronics may include circuitry to convert the output voltage of the battery and ultracapacitor to a voltage suitable for delivering/receiving power from the motor/generator. This circuitry may include DC to DC converters to match voltages of the various electrical system components. The battery and ultracapacitor can both store and receive energy independently or in concert as determined by the power electronics. When the engine produces deficit torque as shown in FIG. 2(b), the engine torque is supplemented with torque produced by the Motor/Generator 14 using energy previously stored in the Battery 22 and/or Ultracapacitor 24. The illustrated embodiment uses an ultracapacitor in conjunction with a conventional battery pack, but in other embodiments the ultracapacitor could be used without a battery pack or a battery pack alone could be used. As will be described in more detail below, the addition of the ultracapacitor leads to a larger improvement of the overall fuel economy of the vehicle since it largely avoids the energy losses associated with charging and discharging conventional batteries which is particularly advantageous when relatively frequent storage and retrieval cycles are contemplated.

In one implementation, a control system for a variable displacement engine 10 may be arranged to calculate the lowest available engine displacement state that can deliver the desired powertrain output. If the variable displacement engine is designed to individually deactivate any number of cylinders individually, then this would correspond to the minimum number of cylinders needed to deliver the desired output assuming that the active cylinders are operated under conditions that provide the best overall fuel economy given the current operating conditions (e.g. engine speed). However, it should be appreciated that many commercially available variable displacement engines are only capable of operating in a relatively smaller subset of states—e.g., a 4/8 variable displacement engine which is an 8 cylinder engine that can only be operated in four and eight cylinder modes or a 3/4/6 variable displacement engine which is a six cylinder engine that can only be operated in three, four or six cylinder modes. In such cases, the minimum lowest available engine displacement would need to be determined based on the displacements that can actually be attained by the engine.

If the energy storage system holds less than a designated low threshold amount of energy, the control system places the engine in the lowest available engine state that can deliver the desired output. The cylinders are then operated under conditions that deliver substantially their best overall fuel economy and the controller causes any surplus energy (which typically would be expected) to flow into the storage system. This continues until the energy storage system holds more than a designated high threshold amount of energy.

When the high threshold is reached (or alternatively, if the energy storage system is initially determined to hold more than said high threshold amount of energy), the powertrain control system communicates a request to the variable displacement engine electronic control module to reduce the displacement of the engine. This can be accomplished by deactivating one or more of the currently operating cylinders, by switching to the next lower available displacement state, or in any other suitable manner—however, the cylinders that remain active continue to be operated under conditions that facilitate substantially the best overall fuel economy. This results in the engine providing less than the desired powertrain output. Accordingly, the control system simultaneously causes an energy conversion device (e.g., Motor/Generator 14) to supplement the powertrain torque. Energy to drive the energy conversion device is supplied by the energy storage system. The engine continues to operate in this manner until the low threshold is reached at which point the engine displacement is increased again to a level that can meet or exceed the requested torque and the process may be repeated again and again alternating between storage system charging and discharging states. It should be appreciated that the benefit of the described approach is that the operating cylinders can be operated at near their peak efficiency (e.g., near their minimum BSFC) while the system continues to deliver the desired powertrain output. Such an approach can provide better system fuel economy than conventional variable displacement engines and/or conventional hybrid systems.

Although steady-state operation has been described for purposes of clarity, it should be appreciated that the described approach is in no way limited to steady-state power requests. Rather, the requested output of the engine may vary widely over time, and indeed in many instances, it can and will be almost continually changing. To accommodate such changes, the hybrid powertrain controller can be arranged to repeatedly recalculate the minimum number of cylinders required to deliver the currently requested output and if a change is identified in the lowest available engine displacement state that can deliver the desired powertrain output appropriate change can be made to the engine displacement.

Figure 3:
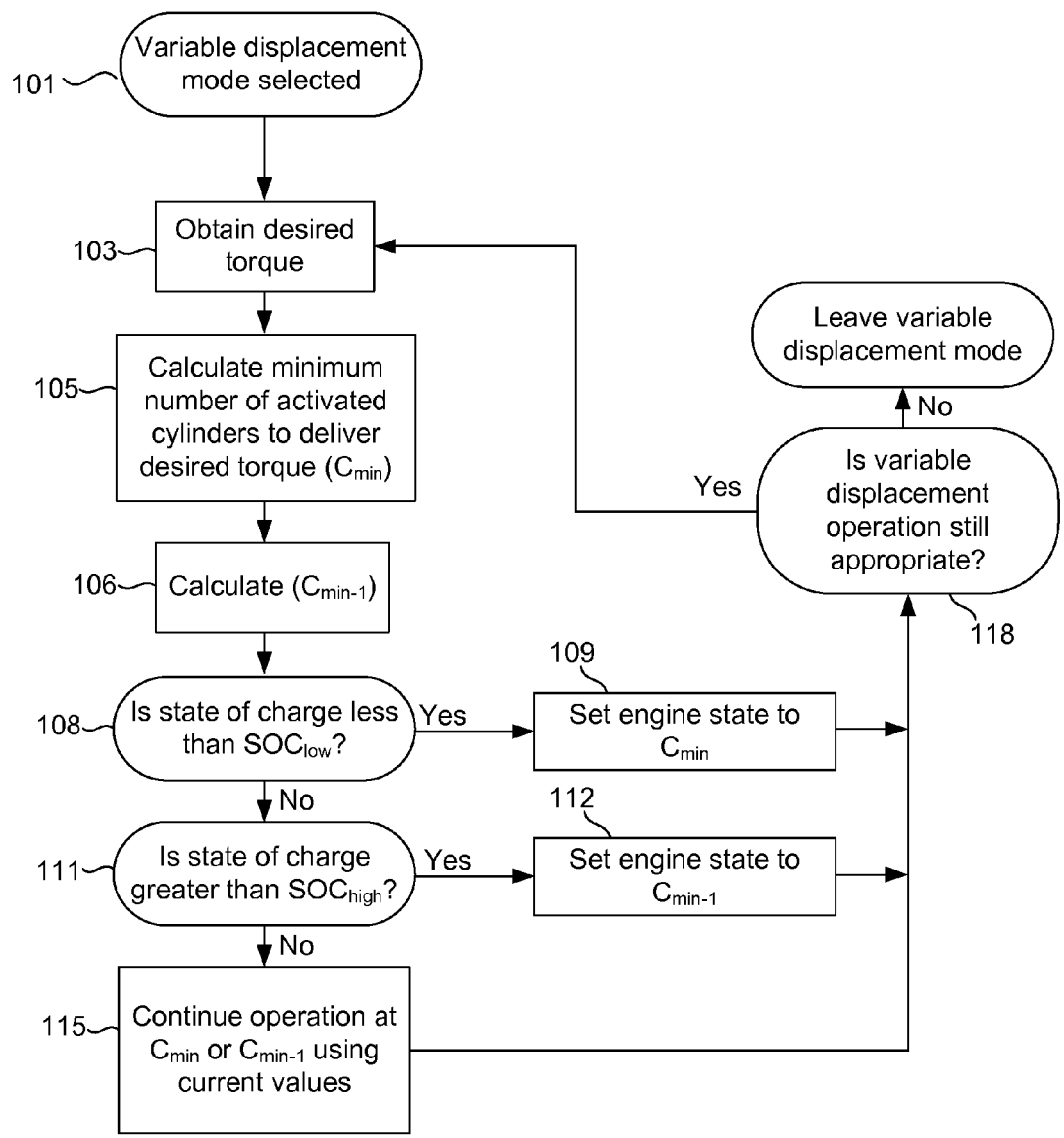
FIG. 3 is a flow diagram that illustrates one method of determining the number of cylinders to use in (i.e., the operating state of) a variable displacement engine.

FIG. 3 illustrates a process suitable for use by a powertrain controller to deliver a desired torque in a Power Delivery System (PDS) that includes a variable displacement internal combustion engine and an electric motor. Generally, the process begins at step 101 when variable displacement mode operation is selected. This determination would typically be made by a powertrain controller. When variable displacement mode operation not selected, the engine 10 and motor/generator 14 are operated in a conventional hybrid operational mode. That is, when the engine is active, it is operated in a conventional, all cylinder operating mode. Alternatively, when variable displacement operation is appropriate and selected, the operating mode calculator obtains the desired torque in step 103. The desired torque is typically determined by other components of the powertrain controller system based on the vehicle driver controls (e.g. accelerator pedal position), as well as other vehicle systems. In the illustrated process, the operating mode calculator calculates the minimum number of activated cylinders ($C_{min}$) needed to provide a torque greater than or equal to the desired torque. It also determines the torque that will be available operating at $C_{min}$ with each activated cylinder operating under conditions of best overall efficiency. Step 105. Operation at $C_{min}$ under conditions of best overall efficiency will generally cause the engine to provide excess torque by "rounding up" the number of activated cylinders.

In step 106 the operating mode calculator determines the next lower available displacement, ($C_{min-1}$) and also determines the torque that would be available from the variable displacement engine with $C_{min-1}$ activated cylinders, which inherently will provide a lower engine torque than the desired torque. Thus, operation at $C_{min-1}$ will produce a deficit torque by effectively "rounding down" the number of activated cylinders.

In step 108 the operating mode calculator determines whether the current state of charge of the energy storage system is above a predetermined threshold low state of charge ($SOC_{low}$). If cylinder deactivation is currently allowed and said current state of charge is below the threshold low state of charge ($SOC_{low}$), then the powertrain controller commands the variable displacement engine to operate with $C_{min}$ activated cylinders, thereby producing all of the required torque, as well as some surplus torque, which is used to drive the motor/generator 14 as a generator and thereby store electrical energy in the energy storage system which includes the battery 22 and ultracapacitor 24. Step 209.

In step 111 the operating mode calculator determines if the current state of charge is equal to or above a high threshold state of charge ($SOC_{hi}$), then the controller commands the variable displacement engine to operate with $C_{min-1}$ activated cylinders, thereby producing less torque than necessary (deficit torque). Step 112. Simultaneously, the powertrain controller also causes the deficit torque to be supplied by the motor/generator 14 operating as a motor.

If the state of charge is in a range between the high and low thresholds, than operation is continued at the current state (i.e., $C_{min}$ or $C_{min-1}$ activated cylinders) as represented at step 115. It is noted that the desired torque may (and indeed often will) change during variable displacement operation. In some circumstances this will cause a change in $C_{min}$ and in others it won't. If $C_{min}$ changes, than the number of active cylinders may be changed accordingly.

The control process shown in FIG. 3 is continuously performed as long as variable displacement operation is still allowed. If at any time it is determined that variable displacement operation is no longer appropriate (step 118) the variable displacement mode is exited and normal hybrid operation with conventional all cylinder operation of the engine is resumed.

During periods of time when said cylinder deactivation is allowed, the overall effect is to cause switching back and forth between modes of producing surplus torque and adding deficit torque. When producing surplus torque, $C_{min}$ cylinders may be operated at their best overall efficiency with the surplus energy being stored in the ultracapacitor 24 (or other appropriate storage). When $C_{min-1}$ cylinders are used, they are still operated at their best overall efficiency with the motor supplying the deficit torque.

Employing an ultracapacitor 24 connected to the motor/generator 14, but isolated from said battery 22 tends to provide the best overall efficiency operation because the round trip efficiency of storing and retrieving energy from a capacitor tends to be better than the round trip efficiency of storing and retrieving energy from a battery. Ultracapacitor sizing or capacity may be determined by how frequently changes to the number of activated cylinders is acceptable, based on the design of the activation/deactivation system, NVH concerns and other design factors.

It is noted that there are some operational conditions where the generator 14 may generate more than can be absorbed by the ultracapacitor 24. One good example of such a scenario is during regenerative braking. Thus, in some embodiments, the Power Electronics module 26 is arranged to causes regenerative braking derived electrical energy to be stored in the battery 22, once the ultracapacitor is charged to a chosen threshold.

Figure 4:
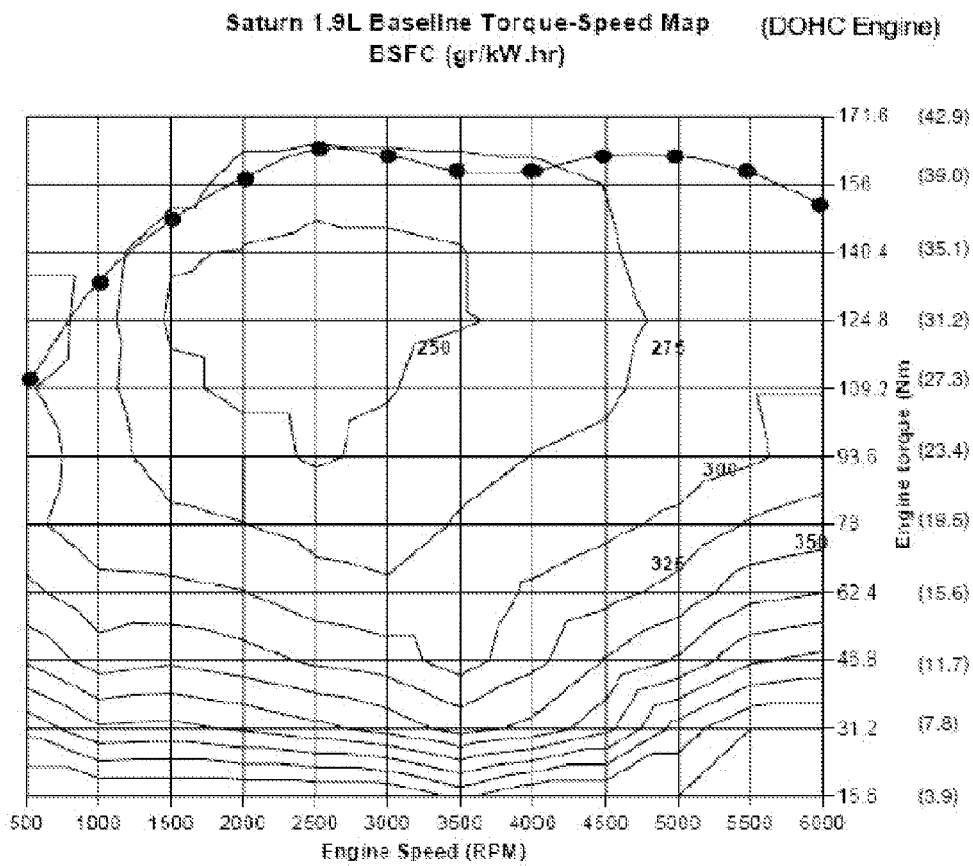
FIG. 4 is a graph illustrating brake specific fuel consumption vs. engine speed and torque of a 4 cylinder passenger vehicle internal combustion engine with the approximate torque per cylinder in parentheses.

FIG. 4 is an exemplary BSFC map for an actual 4 cylinder passenger car engine, showing the BSFC in units of grams per kilowatt-hr, vs. engine speed in rpm and engine torque in N-m from the combined 4 cylinders. Approximate engine torque values per cylinder, in N-m, are also shown in parentheses.

For illustrative purposes, if a 4 cylinder engine had variable displacement capabilities using the cylinder deactivation scheme disclosed by the present invention, allowing n cylinders to be activated (for n=0, 1, 2, 3, or 4), then said engine torque shown in parentheses would be indicative of the approximate torque output of the engine per activated cylinder. The region of minimum BSFC and best engine efficiency would occur at approximately 2500 rpm and 31.2 N-m per activated cylinder.

The control scheme shown in FIG. 3, applied to the hybrid apparatus shown in FIG. 2, seeks to cause the variable displacement engine to output the required torque on average, with each activated cylinder continuously operating close to the minimum BSFC and best cylinder fuel efficiency. Short-term energy storage and retrieval is used to "absorb" excess torque and supply deficit torque using the motor/generator as needed, while the engine remains approximately in the area of best cylinder fuel efficiency as vehicle load changes and as changes are made to the number of cylinders activated and deactivated to maintain an acceptable level of charge below an upper design limit or threshold and above a lower design limit or second threshold of the energy storage system.

Figure 5:
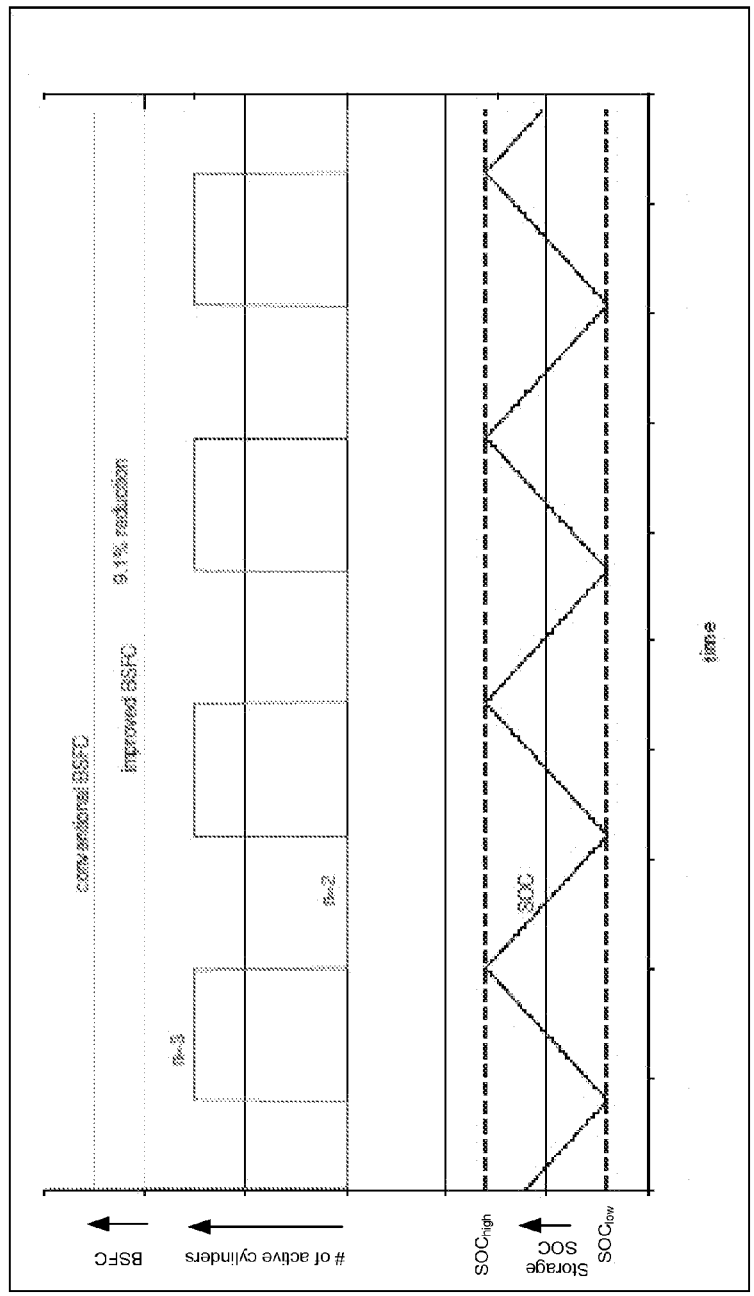
FIG. 5 is a graph illustrating the values of selected variable displacement engine and energy storage system parameters as a function of time while a powertrain produces a constant output torque of 78.0 N-m.

FIG. 5 is a timeline illustrating the values of selected variable displacement engine and energy storage system parameters as a function of time while an powertrain is expected to deliver a constant net output. The figure illustrates how the engine brake specific fuel consumption may be reduced by approximately 9% by employing the present invention. The number of activated cylinders is caused to change by the control system shown in FIG. 3, applied to the exemplary hybrid powertrain shown in FIGS. 2(a) and 2(b). In doing so, the variable displacement engine continuously operates at close to the minimum BSFC for the full range of possible vehicle loads, up to the engine torque associated with minimum engine BSFC.

The illustrated example assumes a Torque Required (TR) from the Power Delivery System (PDS) of 78.0 N-m at a vehicle speed corresponding to an engine speed of 2000 rpm in the exemplary case of a parallel hybrid PDS (a preferred engine speed of 2500 rpm in the case of a series or power split hybrid PDS). It is also assumed, only for purposes of illustration, that the energy storage system employs a storage medium with minimum storage and retrieval losses, e.g. an ultracapacitor.

Following the process of FIG. 3, $C_{min}$=RoundUpInteger (78.0 N-m/31.2 N-m)=RoundUpInteger (2.5)=3, and $C_{min-1}$=3−1=2. Therefore, under the present operating conditions, and while cylinder deactivation is allowed, the control system will cause the variable displacement engine to modulate between 3 activated cylinders providing approximately 3×31.2 N-m−78.0 N-m, or 15.6 N-m of surplus torque, and 2 activated cylinders providing 78.0 N-m−(2×31.2 N-m), or 15.6 N-m of deficit torque, depending on the Energy Storage System State of Charge (SOC). When the engine is operating on 3 cylinders, producing surplus torque, the surplus torque is used to charge the energy storage device using the motor/generator as a generator until the $SOC_{hi}$ threshold is reached. Once the $SOC_{hi}$ threshold is reached, said engine is caused to operate on 2 activated cylinders, producing deficit torque. The deficit torque is supplemented by torque from the electric motor/generator using the stored charge in the energy storage device until the $SOC_{low}$ threshold is reached, upon which, the process is repeated.

Figure 6:
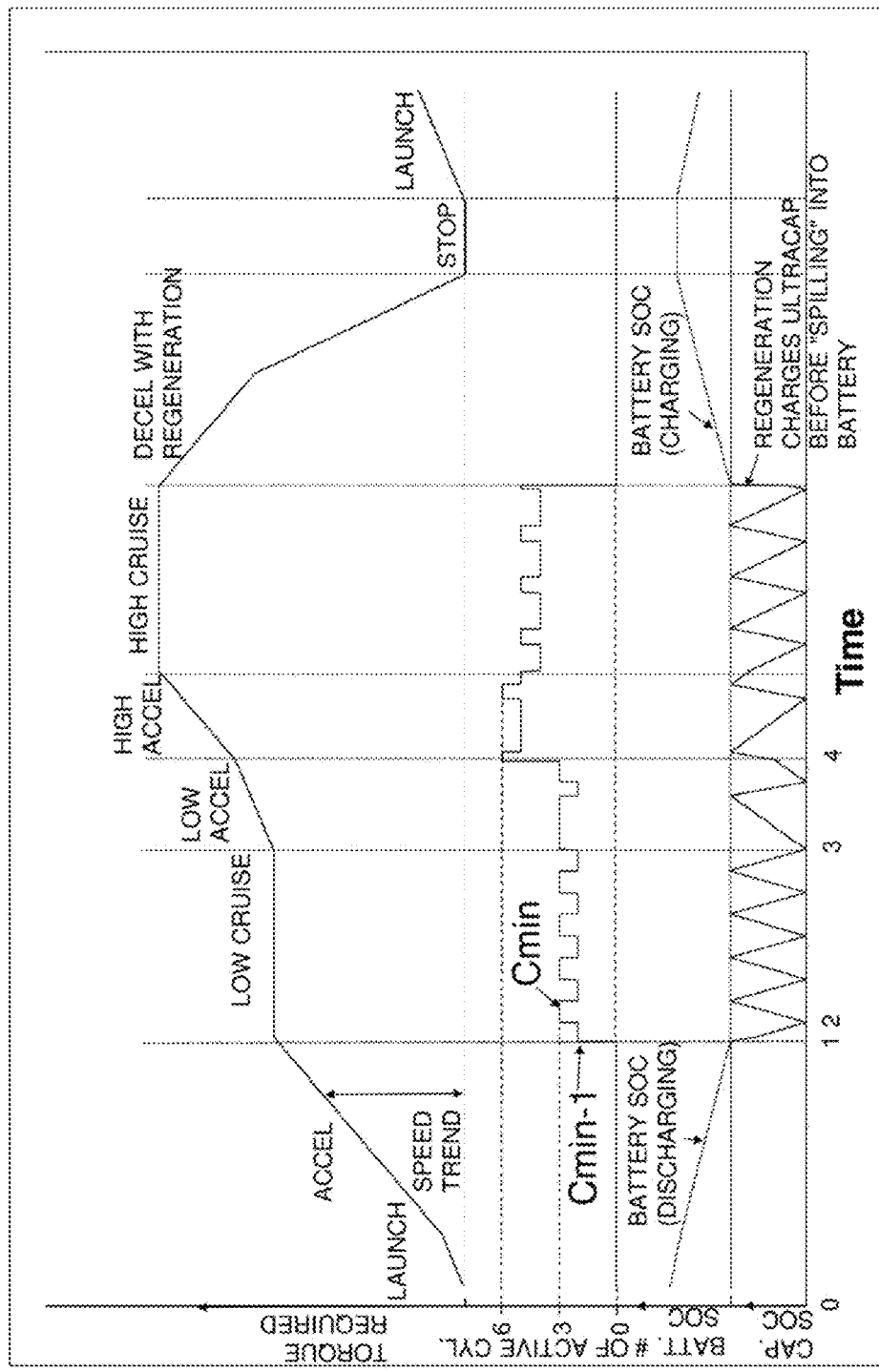
FIG. 6 is a graph illustrating the values of selected variable displacement engine and energy storage system parameters as a function of time while a hybrid vehicle goes through a range of different operating conditions.

For clarity, FIG. 5 illustrates operation during a period in which a constant output is desired. However, it should be appreciated that in reality, the requested powertrain output will typically vary significantly over the course of operation of a vehicle. The effects of such variation are illustrated in FIG. 6, which is a timeline showing the values of selected variable displacement engine and energy storage system parameters as a function of time while a hybrid vehicle goes through a range of different operating conditions. In this example, the engine is a six cylinder variable displacement engine. In the illustrated operating sequence, a vehicle begins at rest at time 0, with the engine off and all intake and exhaust valves closed for minimum energy losses upon turning of the engine crankshaft. The battery state of charge (SOC) is greater than zero, and the ultracapacitor 24 has a SOC=$SOC_{hi}$, the upper desired threshold SOC.

As the driver depresses said vehicle's accelerator pedal, said vehicle launches and accelerates using only the electric motor powered by the hybrid battery storage, as is commonly done in hybrid electric vehicles available at the present time. During this period, the battery storage decreases as shown by the SOC decline.

When the battery energy storage is below a chosen SOC threshold, or when vehicle speed is above a chosen speed threshold (time 1), the variable displacement engine is started by activating at least one (1) cylinder and supplying fuel to the activated cylinder(s). In the present example the Torque Required TR from the overall Power Delivery System, as shown in FIG. 3, is equal to a torque value greater than the engine could provide operating with two (2) activated cylinders and 4 deactivated cylinders, each deactivated cylinder having closed valves to minimize pumping losses, and each activated cylinder operating under conditions to achieve best overall Power Delivery System fuel efficiency in terms of fuel consumed per work done by the overall Power Delivery System.

The value of the Torque Required is also less than said engine is capable of providing while operating with three (3) activated cylinders and 3 deactivated cylinders, each deactivated cylinder having closed valves to minimize pumping losses, and each activated cylinder operating under conditions to achieve best overall Power Delivery System fuel efficiency.

Informally speaking, the Torque Required from the Power Delivery System lies between the torque said engine is capable of delivering with two (2) cylinders operating at peak PDS efficiency and three (3) cylinders operating at peak PDS efficiency, with the other cylinders deactivated in such a way as to create the least energy losses possible.

Referring to FIG. 3, since the ultracapacitor SOC exceeds the chosen $SOC_{hi}$ threshold when the engine starts, the engine begins operation with $C_{min-1}$ activated cylinders, in this case two (2) cylinders. If the ultracapacitor SOC was less than the chosen $SOC_{low}$ threshold, the engine would have begun operation with $C_{min}$ activated cylinders, i.e. three (3) activated cylinders.

In the case of a hybrid-electric vehicle employing the present invention without using an ultracapacitor, the $SOC_{hi}$ and $SOC_{low}$ chosen thresholds would relate to the state of charge of the storage battery. The thresholds could refer to the state of charge of a segregated portion of the storage battery or could refer to the state of charge of the entire storage battery.

In the case of a hydraulic-hybrid vehicle, said thresholds would refer to the state of charge of the hydraulic accumulator.

There exists a trade-off between consuming additional fuel in creating additional surplus energy to cause the engine efficiency to be higher, and the losses associated with generating the electrical energy to be stored and the losses associated with storage and retrieval of said additional surplus energy. Use of an energy storage device with small charging and discharging losses, for storing and retrieving surplus energy associated with the scheme of FIG. 3, leads to achieving the maximum improvement in overall PDS efficiency.

Once the engine has started, each of the two (2) activated cylinders is operated under conditions of maximum PDS fuel efficiency.

Since the engine is operating on $C_{min-1}$ activated cylinders, it is producing deficit torque, i.e. the engine torque is less than said Torque Required. Therefore, the hybrid vehicle electric motor/generator must be caused to act as a motor to supplement the engine torque so that the total Power Delivery System torque equals Torque Required. Since the hybrid electric motor is powered by the energy stored in the ultracapacitor, the ultracapacitor SOC decreases with time as its stored energy is depleted.

In the "low cruise" region of vehicle operation as shown in FIG. 6, the vehicle speed is steady on level ground and the Torque Required is constant. When the ultracapacitor SOC drops below the $SOC_{low}$ threshold (time 2), the control system causes the variable displacement engine to operate with $C_{min}$=3 activated cylinders and three (3) deactivated cylinders, as determined by the logic shown in FIG. 3. Each activated cylinder is caused to operate at the conditions associated with best overall PDS fuel economy.

The engine operation continues with three (3) activated and three (3) deactivated cylinders which produces surplus torque. The control system causes the motor/generator to act as a generator and produce surplus electrical energy using the surplus torque. The surplus energy is stored in the ultracapacitor. The process continues indefinitely with alternating periods of surplus torque followed by deficit torque and the associated storage of energy in the ultracapacitor followed by retrieval of the stored energy.

A mild or low acceleration (time 3) following the cruise conditions results in a higher value of Torque Required. In the present example, the increased Torque Required value is still satisfied by alternating between the same $C_{min}=3$ activated cylinders and $C_{min-1}=2$ activated cylinders. But the engine now operates on $C_{min}=3$ activated cylinders a higher percentage of time compared to its operation on $C_{min-1}=2$ activated cylinders because the average engine torque output needs to be higher.

Under the increased loading conditions associated with the "low accel" region of FIG. 6 described above, when operating with three (3) activated cylinders, the surplus torque is less than the surplus torque under the preceding "low cruise" region of said figure. For this reason there is less available torque to drive the generator and create electrical energy for storage in the ultracapacitor. The ultracapacitor charging rate is therefore lower, as shown.

Upon the ultracapacitor state of charge reaching $SOC_{hi}$ (time 4), the control system causes said engine to continue running with $C_{min-1}=2$ activated cylinders. The deficit torque is greater than the deficit torque experienced under the preceding "low cruise" region of FIG. 6. For this reason more torque is required from the electric motor, thereby discharging the ultracapacitor at a greater rate compared with the discharge rate while in the "low cruise" region.

As shown in the "high accel" region of FIG. 6, higher acceleration rates require an increase in $C_{min}$. In the present example, fewer than $C_{min}=6$ activated cylinders cannot supply "at least" the necessary torque, or Torque Required.

The "high accel" region shown in FIG. 6 is indicative of an increase in acceleration compared with the "low accel" region also shown in the figure. In this particular example, the surplus torque available to drive the generator and charge the ultracapacitor is large, with a correspondingly small amount of deficit torque experienced when operating with $C_{min-1}=5$ activated cylinders. For this reason, the ultracapacitor charges quickly and discharges slowly in this region of vehicle operation. The amount of time the engine operates on 6 activated cylinders is small compared with the operating time on 5 activated cylinders.

After the vehicle reaches the "high cruise," steady-speed, level road region shown in FIG. 6, the Torque Required is lower than the preceding "high accel" region. For this region, $C_{min}=5$ and $C_{min-1}=4$. The control system causes the variable displacement engine to alternate between 5 activated cylinders and 4 activated cylinders, the remaining cylinders deactivated, with corresponding rates of charging and discharging the ultracapacitor as shown. All activated cylinders operate under conditions of maximum overall PDS fuel efficiency and all deactivated cylinders operate with closed valves to result in the smallest energy losses possible.

Decelerating the vehicle with a release of accelerator pedal pressure causes the engine to turn off by stopping the fuel supply to all cylinders, and causes all intake and exhaust valves to close to minimize pumping energy losses.

The control system causes the motor/generator to act as a generator to facilitate regeneration, i.e. to convert kinetic energy of the vehicle into electrical energy and to store said electrical energy, as is commonly done in hybrid-electric vehicles.

The ultracapacitor is charged to $SOC_{hi}$ before any energy is stored in the battery since battery storage and retrieval has higher energy losses compared with the ultracapacitor. The remaining regeneration energy is subsequently stored in the hybrid-electric battery in the normal manner for a hybrid-electric vehicle with regenerative braking, i.e. as chemical energy.

Following the "decel with regeneration" mode, the vehicle comes to a stop. At this point the engine is off, the ultracapacitor is fully charged, and the battery is at least partially charged.

The variable displacement, internal combustion engine used with the present invention can be designed in such a way that all of the operation described above not only occurs at the best overall PDS energy efficiency for each engine speed experienced, but also occurs with no intake air throttling, i.e. at the equivalent of Wide Open Throttle (WOT), and therefore without the need of a throttle valve or engine idle air controller. In other words, the power modulation scheme described above can be used to control the engine torque without the use of intake air throttling (as is normally the case in a conventional diesel engine) and its associated energy losses, with minimal other pumping losses by closing the intake and exhaust valves on deactivated cylinders, and with activated cylinders operating in such a way as to maximize the overall energy efficiency of the PDS.

The engine design can then be optimized for continuous operation at peak energy efficiency (near minimum BSFC), thereby further reducing BSFC or improving fuel economy.

For a given engine design and associated BSFC map, e.g. the one shown in FIG. 4, if the absence of a throttle valve (i.e. WOT operation) is associated with lower PDS efficiency than would be obtained with some throttling, exhaust gas recirculation (EGR) can be used to reduce the activated cylinder torque outputs to the values associated with highest PDS efficiency. In this way all the benefits of removing the throttle valve are achieved (lower cost and higher efficiency), while also achieving highest PDS efficiency.

Removing the throttle valve results in improved fuel efficiency by eliminating throttling losses. The throttle body, housing the throttle valve, and the motor to control the throttle valve in "by-wire" systems can also be eliminated, resulting in additional manufacturing cost savings.

Since each activated cylinder is running under nearly identical conditions whenever, and for as long as it is activated, the exhaust gas emissions control system can be simplified, leading to additional overall vehicle cost savings. Large changes in instantaneous engine load, which can lead to high exhaust emissions in a conventional vehicle, are only experienced when the number of activated cylinders changes, and those events are known to said engine control system in advance, since said control system is determining how many, and which cylinders will be activated. The engine control system can be calibrated to minimize the resulting emissions due to the periodic, nearly identical, and known load changes over time.

The steady-load operating percentage of time is greatly increased by employing the present invention, thereby offering advantageous operation from an emissions control perspective, compared to both a conventional vehicular engine and a conventional hybrid engine.

Application to a commercially available hybrid electric vehicle will exemplify construction of the present invention. Consider a parallel hybrid-electric vehicle with, but not limited to, the following attributes:

4 cylinder, 4 stroke, gasoline-fueled, internal combustion engine;
 Deactivation of all cylinders by closing all intake and exhaust valves capable;

Combined engine/motor peak power=110 hp (82.5 kW);
Electric Motor Power=23 hp (17.2 kW);
Peak Engine Power=87 hp (65.3 kW);
Peak Engine Power per Cylinder=65.3 kW/4 cyl.=16.3 kW/cyl;
Minimum Electric Motor Power Needed=Peak Engine Power per Cylinder=16.3 kW;
Therefore, the 23 hp (>16.3 hp) motor is sufficient for applying the present invention;
Replace intake and exhaust valve operating mechanisms and associated valve control system with individually activated/deactivated valve, valve control system known in the art to result in a variable displacement engine operating on 0, 1, 2, 3, or 4 activated cylinders, with the remaining cylinders deactivated;
Dampen introduced vibrations employing methods known in the art;
Peak surplus power=peak engine power per cyl×1 cyl=16.3 kW;
Peak deficit power=peak surplus power=16.3 kW;
Average Surplus Engine Power=16.3 kW/cyl×½ cyl=8.15 kW (½ of a single cylinder equivalent);
Average Deficit Engine Power=Average Surplus Engine Power=8.15 kW;
For purposes of illustration, determine ultracapacitor size C required to ensure charging time is never less than minimum (min.) allowable time=10 sec, and discharging time is never less than min. allowable time=10 s to define the highest frequency of the cylinder activation/deactivation process to ensure compatibility with activation/deactivation mechanisms known in the art. Assuming no losses for simplicity, the estimated energy Emin needing to be stored for each cylinder activation/deactivation cycle while operating under peak surplus torque conditions is:

$$E\text{min}=\text{Peak Surplus Power}\times\text{min. allowable time, or}$$

$$E\text{min}=16.3\text{ kW}\times10\text{ s}=163\text{ kJ};$$

Figure 7:
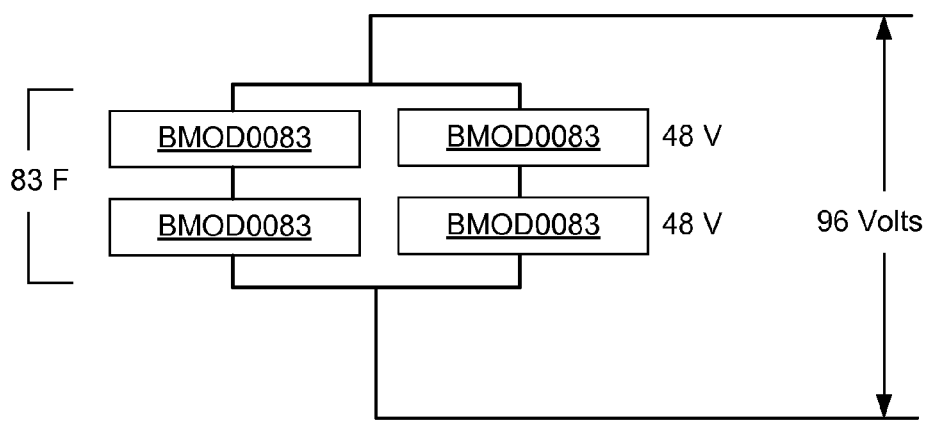
FIG. 7 is a schematic diagram of an ultracapacitor suitable for use in particular applications.

For an ultracapacitor of capacitance C, with a potential difference (voltage) of V, the stored energy E is given by: $E=\frac{1}{2}CV^2$;
To meet the stored energy requirements different combinations of capacitance and voltage may be used. Readily available and known capacitors can be configured to provide this level of operating voltage and capacitance. For example, 4 Model #BMOD00083 ultracapacitors available from Maxwell Technologies Inc. of San Diego, Calif. may be used. Each individual capacitor has a capacitance of 83 Farads and a maximum voltage of 48 Volts. Arranging the four capacitors in a network of two serial and two parallel capacitors as shown in FIG. 7 yields a net total capacitance of 83 F and maximum voltage of 96 V. This combination is capable of storing significantly more than the calculated required energy, 383 kJ compared to the required 163 kJ. This excess provides margin to account for the inevitable system losses. It also ensures that the capacitor network is sufficiently sized to avoid overheating from the continual charging and discharging of the capacitor. Use of the Model #BMOD0083 capacitors is for exemplary purposes only, as there are additional benefits to using an ultracapacitor optimized for the particular vehicle employing the current invention.

In the example given above, the capacitor is sized to permit charge and discharge cycles to extend for a minimum of 10 seconds each. It should be appreciated that these are just examples and that shorter or longer minimum charge/discharge periods may be desirable. An advantage of shorter periods is that smaller ultracapacitors may be used which can help reduce overall system costs. An advantage of longer periods is that fewer displacement/firing fraction changes would be required which can help reduce NVH concerns.

One advantage of using the energy storage/retrieval system described here is that the power profile delivered/received from the energy storage can be controlled. FIGS. 5 and 6 show power profiles from the energy storage which are different than the power profile of an operating cylinder. An operating cylinder produces power only on the power stroke, which is at most a quarter of the time for a four cycle engine. The power profile from the energy storage unit may match this profile or it may be different. An advantageous profile is one where the power profile is smooth, with little or any structure associated with the cylinder firings and skipping. This type of profile will minimize the energy being delivered/received into/from the energy storage. It also will minimize the current required to store that energy. Both these factors improve the overall energy efficiency of the PDS.

In the embodiments described above, a conventional variable displacement engine is used and different effective displacements are achieved by deactivating one or more specific cylinders. However, in other embodiments, other mechanisms may be used to vary the effective displacement of an engine. One such approach is skip fire control. In many skip fire control approaches a set of firing fractions are available to the skip fire controller. In practice, each different firing fraction will correspond to a different effective displacement. Therefore, like in the variable displacement engine example, operating the fired cylinders under conditions that would provide the most efficient BSFC will typically cause the engine output to be mismatched with the requested powertrain output. Thus, the same alternating energy storage and retrieval approach can be used to help optimize efficiency in a skip fire control scheme which has a finite set of available firing fractions.

Although only a few embodiments have been described in detail, it should be appreciated that the invention may be implemented in many other forms without departing from the invention. For example, the primary described embodiment contemplates alternating between the lowest available effective engine displacement state that can deliver the desired powertrain output and the next smaller available effective displacement in order to minimize the amount of energy that must to stored and retrieved during operation. However, in some circumstances it may be desirable to utilize wider displacement swings. For example, in some specific instances such approaches may be desirable to help address NVH issues, to accommodate charging or discharging an energy storage device, to provide improved responsiveness in certain operational conditions or for other specific reasons.

In some applications changes in the displacement may be disfavored so that the effective displacement isn't changed even through variations in the requested torque unless the storage capacity exceeds an upper limit or is below a lower limit or there are significant changes in the requested torque (e.g. a net torque request change of greater than a hysteresis threshold is exceeded). In such applications the capacitors (or other storage devices) may be sized to store more energy so that less frequent effective displacement changes are required.

In the description above, frequent reference is made to a motor/generator 14. It should be appreciated that the motor/generator may be implemented as a single integrated unit that can reversibly run as a motor and a generator or as separate motor and generator components. Furthermore, either the motor or the generator may be implemented as multiple discrete devices and/or any combination of discrete and integrated devices may be used (e.g. 2 or more motors may be used and/or 2 or more generators may be used and/or an integrated motor/generator may be used in combination with a second dedicated motor, etc.).

Many hybrid powertrains are arranged to facilitate regenerative braking. As will be appreciated by those familiar with the art, regenerative braking can generate a significant amount of electrical energy and in many instances, the amount of electrical energy generated during regenerative braking will exceed the available storage capacity of the ultracapacitor. Thus, in some embodiments that utilize both ultracapacitor and battery storage, it may be desirable to direct all of the regenerative braking energy to the battery. In other embodiments, it may be desirable to direct some of the regenerative braking energy to the ultracapacitor and some to the battery. For example, in some specific implementations, regenerative energy may first be directed to the ultracapacitor until the ultracapacitor is full or reaches a designated threshold and then any additional regenerative energy may be directed to the battery.

In some of the described embodiments various thresholds such as the $SOC_{hi}$ and $SOC_{low}$ thresholds are used in making decisions regarding when to switch operating modes. Such thresholds may be fixed points or they may be variables which can change based on any factors that the controller designer deems appropriate. By way of example, in some implementations, it may be desirable vary the SOC thresholds based on operating parameters such as engine firing fraction or transmission gear, or characteristics of the energy storage system such as capacitor temperature, charge/discharge cycle times or any other relevant factor or factors.

In embodiments that utilize ultracapacitors as part of the electrical storage system, it may sometimes be desirable to include a capacitor cooling system—as may be accomplished, for example, by providing a fan to help cool the capacitor.

In view of the foregoing, it should be apparent that the present embodiments should be considered illustrative and not restrictive and the invention is not to be limited to the details given herein, but may be modified within the scope of the appended claims.

What is claimed is:

1. A method of controlling a hybrid powertrain to deliver a requested powertrain output, the method comprising alternatingly:
operating an internal combustion engine in one or more first effective displacement modes that deliver less torque to the powertrain than the requested powertrain output and controlling at least one motor to add torque to the powertrain to cause the delivery of the requested powertrain output wherein electrical energy used to drive the at least one motor during addition of torque to the powertrain is drawn from an electrical energy storage device; and
operating the engine in one or more second effective displacement modes that have a larger effective displacement than the one or more first effective displacement modes and that deliver more than the requested powertrain output and controlling at least one generator to subtract torque from the powertrain to cause the delivery of the requested powertrain output, wherein electrical energy generated by the at least one generator during subtraction of torque from the powertrain is stored in the electrical energy storage device; and
wherein active working chambers in the engine are fired under substantially the same operating conditions in the first and second effective displacement modes and the motor and generator take the form of at least one selected from the group consisting of an integrated motor/generator and separate units.

2. A method as recited in claim 1 wherein:
the electrical energy storage device includes a capacitor and energy added and subtracted from the powertrain is primarily drawn from and stored in the capacitor when alternating between the first and second effective displacement modes; and
the engine is one of (a) a variable displacement engine in which the first and second effective displacement modes correspond to different numbers of active cylinders, and (b) arranged to be operated in a skip fire mode in which the first and second effective displacement modes correspond to different firing fractions.

3. A method as recited in claim 2 wherein during regenerative braking electricity generated by the at least one generator is stored at least in part in both the capacitor and a battery.

4. A method as recited in claim 1 wherein:
the engine working chambers that are fired in the first and second displacement modes are operated in a manner that provide substantially the maximum available energy efficiency; and
any unfired working chambers are deactivated to thereby reduce pumping losses.

5. A method as recited in claim 1 wherein the effective displacements utilized in the first and second effective displacement modes may vary over time.

6. A method as recited in claim 1 wherein the engine transitions directly between the first and second effective displacement modes.

7. A method as recited in claim 1 wherein the engine is a variable displacement engine and the first and second effective displacement modes utilize different numbers of active cylinders and the specific number of active cylinders utilized in the first and second effective displacement modes may vary over time.

8. A method as recited in claim 1 wherein the engine is operated in a skip fire mode and the different first and second effective displacement modes utilize different firing fractions and the specific firing fractions utilized in the first and second effective displacement modes may vary over time.

9. A method as recited claim 1 wherein the energy added and subtracted from the powertrain is primarily drawn from and stored in a capacitor when alternating between the first and second effective displacement modes.

10. A method as recited in claim 9 wherein a motor/generator unit is used to add and subtract energy from the powertrain, the motor/generator being arranged to facilitate regenerative braking, wherein during regenerative braking electricity generated by the motor/generator unit is stored in at least in part in both the capacitor and a battery.

11. A method of controlling a hybrid powertrain to deliver a requested powertrain output, the method comprising alternatingly:
operating an engine in a first effective displacement mode that delivers less torque to the powertrain than the requested powertrain output and controllably utilizing energy drawn from an energy storage device to add torque to the powertrain to cause the net delivery of the requested powertrain output; and
operating the engine in a second effective displacement mode that has a different displacement than the first effective displacement mode and that delivers more than the requested powertrain output and controllably subtracting torque from the powertrain to cause the delivery of the requested powertrain output, wherein excess energy subtracted from the powertrain is stored in the energy storage device, and whereby the engine alternatingly transition back and forth between the first and second effective displacement modes such that the engine alternatingly supplies less torque and more torque than the requested powertrain output.

12. A method as recited in claim 11 wherein the energy added and subtracted from the powertrain is primarily drawn from and stored in a capacitor when alternating between the first and second effective displacement modes.

13. A method as recited in claim 12 wherein a motor/generator unit is used to add and subtract energy from the powertrain, the motor/generator being arranged to facilitate regenerative braking, wherein during regenerative braking electricity generated by the motor/generator unit is stored in at least in part in both the capacitor and a battery.

14. A method as recited in claim 11 wherein the engine working chambers that are fired in the first and second effective displacement modes are operated in a manner that provides substantially the maximum available energy efficiency.

15. A method as recited in claim 11 wherein the engine is a variable displacement engine and the first and second effective displacement modes utilize different numbers of active cylinders and the specific number of cylinders utilized in the first and second effective displacement modes may vary over time.

16. A method as recited in claim 11 wherein the engine is operated in a skip fire mode and the different first and second effective displacement modes utilize different firing fractions and the specific firing fractions utilized in the first and second effective displacement modes may vary over time.

17. A method as recited in claim 11 wherein unfired working chambers are deactivated to thereby reduce pumping losses.

18. A method as recited in claim 11 wherein active working chambers in the engine are operated under substantially the same conditions in the first and second effective displacement modes.

19. A method as recited in claim 11 wherein unfired working chambers are deactivated to thereby reduce pumping losses.

20. An arrangement comprising:
an engine capable of applying torque to a powertrain, wherein the engine is arranged to operate in at least one of a variable displacement mode and a skip fire mode;
an electric motor/generator unit arranged to add torque to and subtract torque from the powertrain during operation of the engine in the variable displacement mode or the skip fire mode;
a battery arranged to store electrical energy, the battery being coupled to the electric motor/generator unit such that the battery may be charged and discharged by the motor/generator unit;
a capacitor arranged to store electrical energy, the capacitor being arranged in a manner that facilitates the storage of electrical energy generated by the motor/generator unit and the delivery of electrical energy to the motor/generator unit during operation of the engine in the variable displacement or the skip fire mode to facilitate adding torque to and subtracting torque from the powertrain; and
a controller arranged to direct the engine and motor/generator unit to cooperatively deliver a requested output.

21. An arrangement as recited in claim 20 wherein the controller is further arranged to operate the engine in a manner that provides substantially the maximum available energy efficiency during operation in the variable displacement mode or the skip fire mode.

22. An arrangement as recited in claim 20 wherein the controller is further arranged to deactivate unfired working chambers in the variable displacement mode or the skip fire mode to thereby reduce pumping losses.

23. An arrangement as recited in claim 20 wherein the controller is further arranged to alternatingly:
operate the engine at a first effective displacement that delivers less torque to the powertrain than the requested output and operate the electric motor/generator to add torque to the powertrain to cause the net delivery of the requested powertrain output, during which the electric motor/generator draws electrical energy from at least one of the capacitor and the battery; and
operate the engine at a second effective displacement that is different than the first effective displacement and that delivers more torque to the powertrain than the requested output and operate the electric motor/generator to subtract torque from the powertrain to cause the delivery of the requested powertrain output, during which the electric motor/generator provides electrical energy to at least one of the capacitor and the battery wherein excess energy subtracted from the powertrain is stored in at least one of the capacitor and the battery.

24. An arrangement as recited in claim 23 wherein the engine is a variable displacement engine and the first and second effective displacements utilize different numbers of active cylinders and the specific number of cylinders utilized in the first and second effective displacement modes may vary over time.

25. An arrangement as recited in claim 23 wherein the engine is operated in a skip fire mode and the different first and second effective displacement utilize different firing fractions and the specific firing fractions utilized in the first and second effective displacement modes may vary over time.

26. An arrangement as recited in any claim 20 wherein the controller is further arranged to deactivate unfired working chambers during operation in a variable displacement mode or a skip fire mode to thereby reduce pumping losses.

27. An arrangement as recited in claim 20 wherein the controller is further arranged to alternatingly:
operate the engine at a first effective displacement that delivers less torque to the powertrain than the requested output and operate the electric motor/generator to add torque to the powertrain to cause the net delivery of the requested powertrain output, during which the electric motor/generator draws electrical energy from at least one of the capacitor and the battery; and
operate the engine at a second effective displacement that is different than the first effective displacement and that delivers more torque to the powertrain than the requested output and operate the electric motor/generator to subtract torque from the powertrain to cause the delivery of the requested powertrain output, during which the electric motor/generator provides electrical energy to at least one of the capacitor and the battery wherein excess energy subtracted from the powertrain is stored in at least one of the capacitor and the battery.

28. An arrangement as recited in claim 27 wherein the engine is a variable displacement engine and the first and second effective displacements are different engine displacements.

29. An arrangement as recited in claim 27 wherein the engine is operated in a skip fire mode and the different first and second effective displacement utilize different firing fractions.

30. A hybrid powertrain controller suitable for use in a vehicle having an engine that drives a powertrain, at least one motor/generator unit arranged to add torque to and subtract torque from the powertrain and a capacitor arranged to store electrical energy, the hybrid powertrain controller comprising:
 an engine controller arranged to operate an engine in a manner that delivers a plurality of different effective displacements;
 a motor controller arranged to direct the operation of at least one motor/generator unit; and
 wherein the engine controller and motor controller are arranged to operate the engine and the motor/generator unit in a manner that delivers a requested powertrain output; and
 the engine controller and motor controller are further arranged to be capable of causing the engine to alternatingly (i) operate the engine in a first effective displacement mode that delivers less torque to the powertrain than the requested powertrain output while operating the motor/generator unit as a motor to add torque to the powertrain using energy stored in the capacitor to cause the net delivery of the requested powertrain output, and (ii) operate the engine in a second effective displacement mode that has a different displacement than the first effective displacement mode and that delivers more than the requested powertrain output while operating the motor/generator unit as a generator to subtract torque from the powertrain to cause the net delivery of the requested powertrain output, wherein electricity generated by the generator is used to charge the capacitor during operation of the engine in the second effective displacement mode.

31. A hybrid powertrain controller as recited in claim 30 further arranged to:
 operate the engine in a manner that provides substantially the maximum available energy efficiency during operation in the plurality of different effective displacements; and
 deactivate unfired working chambers during operation in the plurality of different effective displacements to thereby reduce pumping losses.

32. A hybrid vehicle powertrain comprising a motor, a generator, an engine capable of operating with at least one deactivated cylinder, an energy storage device, and a controller capable of directing operation of the powertrain in a manner in which activated cylinders of the engine are operated at substantially at their maximum energy efficiency during which time:
 (i) said engine sometimes operates, at a reduced output that is lower than the required total powertrain output by deactivating at least one cylinder, when said energy storage device's stored energy is sufficient to cause said motor to compensate for the difference between said required output and said reduced output; and
 (ii) said engine sometimes operates at an increased output exceeding the required total powertrain output when said energy storage device possesses enough available storage capacity to store the difference between said required output and any surplus output exceeding said required output.

33. A hybrid vehicle powertrain as recited in claim 32, wherein the energy storage device is a battery.

34. A hybrid vehicle powertrain as recited in claim 32, wherein the energy storage device is an ultracapacitor.

35. A hybrid vehicle powertrain as recited in claim 32, wherein the energy storage device is comprised of both a battery and an ultracapacitor.

36. A hybrid vehicle powertrain as recited in claim 35, wherein the ultra capacitor is partitioned from the battery.

\* \* \* \* \*

UNITED STATES PATENT AND TRADEMARK OFFICE
CERTIFICATE OF CORRECTION

PATENT NO. : 8,880,258 B2  
APPLICATION NO. : 13/681378  
DATED : November 4, 2014  
INVENTOR(S) : Breton et al.

It is certified that error appears in the above-identified patent and that said Letters Patent is hereby corrected as shown below:

In the Claims

1. In Line 3 of Claim 25 (Column 18, Line 35) change "displacement" to --displacements--.

2. In Line 5 of Claim 25 (Column 18, Line 37) change "displacement modes" to --displacements--.

3. In Line 3 of Claim 29 (Column 19, Line 3) change "displacement" to --displacements--.

Signed and Sealed this  
Twentieth Day of February, 2018

Andrei Iancu  
*Director of the United States Patent and Trademark Office*